United States Patent [19]
Gayle et al.

[11] Patent Number: 6,095,448
[45] Date of Patent: Aug. 1, 2000

[54] MICROFILM CARTRIDGE ASSEMBLY

[75] Inventors: Harold R. Gayle, Middletown; Gregory J. Gayle, Bear; Herbert I. Moelis, Middletown, all of Del.

[73] Assignee: Microfilm Products Co., Middletown, Del.

[21] Appl. No.: 09/175,263

[22] Filed: Oct. 20, 1998

Related U.S. Application Data

[60] Provisional application No. 60/064,748, Oct. 20, 1997.

[51] Int. Cl.[7] .................................................. G03B 23/02
[52] U.S. Cl. ........................................................ 242/348
[58] Field of Search ................................... 242/345, 348, 242/588, 588.6; 396/512

[56] References Cited

U.S. PATENT DOCUMENTS

| | | | |
|---|---|---|---|
| 2,183,522 | 12/1939 | Wittel et al. | 242/345 |
| 3,161,362 | 12/1964 | Smith, II . | |
| 5,667,160 | 9/1997 | Mattson et al. | 242/348 |

*Primary Examiner*—John Q. Nguyen
*Attorney, Agent, or Firm*—Connolly Bove Lodge Hutz LLP

[57] ABSTRACT

A microfilm cartridge assembly includes a hollow housing in which a reel is mounted. A bearing surface results from the end of a boss on the reel making contact with a circular seat around a boss on one of the walls of the housing. The housing boss is inserted into the reel boss to provide a second bearing surface between the telescopically arranged bosses.

11 Claims, 1 Drawing Sheet

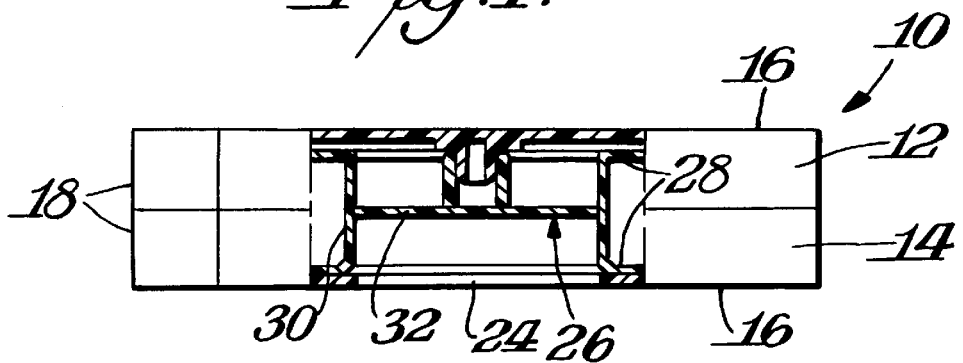
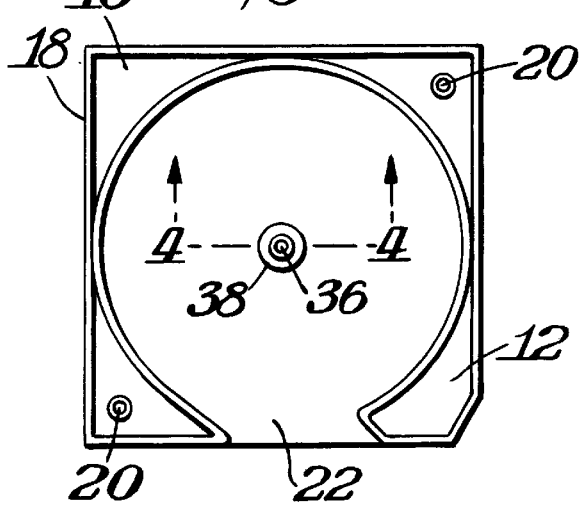
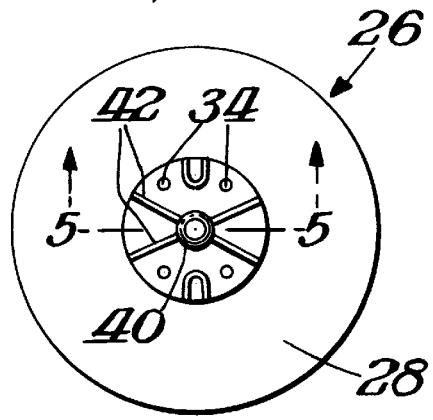
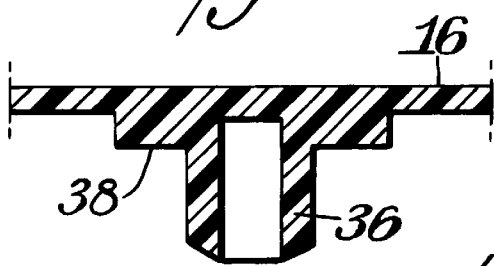
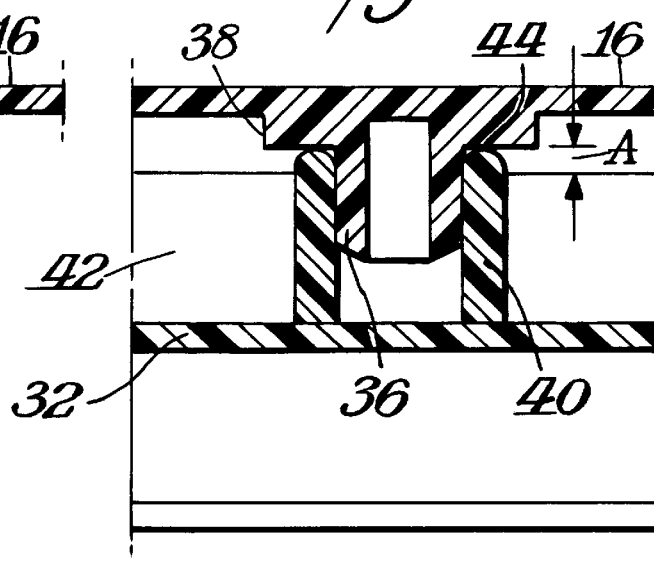

MICROFILM CARTRIDGE ASSEMBLY

CROSS-REFERENCE TO RELATED APPLICATION

This application is based upon provisional application Serial No. 60/064,748 filed Oct. 20, 1997.

BACKGROUND OF THE INVENTION

Microfilm cartridge assemblies are known. Such assemblies generally include a cartridge or housing in which a reel is mounted. The microfilm is wound on the reel. During operation the reel rotates as the microfilm is unwound and pulled from a dispensing opening in the cartridge. The rotation of the reel is achieved by mounting the reel to a spindle which in turn is rotatably mounted. Ideally, there should be a firm mounting of the reel in the cartridge during the rotation of the reel.

Various microfilm cartridge assemblies are described in U.S. Pat. Nos. 5,667,160, 4,555,077, 3,161,362, 3,025,012 and 2,837,332.

SUMMARY OF THE INVENTION

An object of this invention is to provide a microfilm cartridge assembly which includes novel structure for the bearing surfaces of the reel in the cartridge housing.

In accordance with this invention the cartridge housing has an inwardly directed boss on the inner surface of one housing wall. An outwardly extending seat or flange is disposed at least partially around the boss. The reel also has a boss which is disposed in telescopic arrangement with the boss on the cartridge wall. The end of the reel boss is in rotational contact with the seat. As a result, two bearing surfaces are formed, namely at the seat or flange around the cartridge boss and at a perpendicular surface that comes in contact with the reel face and the inner surface of the reel boss.

Preferably, the seat or flange is a raised shoulder that extends completely around the cartridge boss. The reel boss is hollow so that the cartridge boss can be inserted into the reel boss.

THE DRAWINGS

FIG. 1 is a side elevational view partly in section of a microfilm cartridge housing in accordance with this invention;

FIG. 2 is a plan view of one of the cartridge housing members shown in FIG. 1;

FIG. 3 is a plan view of the reel shown in FIG. 1;

FIG. 4 is a cross-sectional view taken through FIG. 2 along the line 4—4; and

FIG. 5 is a cross-sectional view taken through FIG. 3 along the line 5—5 showing the reel mounted to the housing.

DETAILED DESCRIPTION

The present invention relates to the provision of novel bearing structure for permitting the reel to rotate when mounted in a cartridge. Reference is made to the above noted patents, all of the details of which are incorporated herein by reference thereto. These patents illustrate general structure for various types of cartridges and reels.

As illustrated in FIG. 1 the microfilm cartridge assembly 10 comprises a housing formed of first and second housing members 12,14, each of which comprises about one-half of the assembled cartridge. Each housing member includes an outer wall 16 and a peripheral side wall 18. Any suitable structure may be provided for detachably locking or mounting the housing members 12,14 together. FIG. 2, for example, illustrates the provision of hollow posts 20 in member 12 which would be aligned with similar hollow posts in member 14 so that fasteners such as screws could be inserted through the aligned posts to lock the cartridge members 12,14 together. As shown in FIG. 2 a dispensing opening 22 is formed in the side walls 18 of the two housing members so that the microfilm may exit through opening 22 in a known manner.

As also shown in FIG. 1 outer wall 16 of first member 14 includes a central opening 24 which would be of circular shape to permit a spindle to be inserted into the chamber created within the hollow housing formed by members 12,14.

Mounted within the hollow housing is a reel 26. Reel 26 would include a pair of spaced circular flanges 28,28. (See also FIG. 1.) Flanges 28,28 extend from a central hub 30. An insert 32 such as a known metal insert is provided centrally across hub 30. Insert 32 has mounting structure such as a plurality of holes 34 as shown in FIG. 3 for coupling to a spindle in a known manner. The microfilm would thus be wound around hub 30 and extend through dispensing opening 22. When the spindle rotates the reel the microfilm would continue to be unwound or rewound depending on the direction of rotation.

The present invention relates to the provision of bearing surfaces to assure a proper mounting of the reel to the housing. FIGS. 1–2 and 4–5 illustrate the bearing surfaces to result from a central boss 36 extending from the inner surface of outer wall 16 of second housing member 12. Outer boss 36 is surrounded by a circular shoulder or flange 38 which forms a seat around boss 36. In the preferred practice of the invention seat 38 extends completely around boss 36. The invention may also be practiced where the seat is non-circular and/or does not extend completely around boss 36.

Reel 26 also includes a centrally located boss 40 which is joined to hub 30 by means of a plurality of spaced ribs 42. As shown in FIGS. 1 and 5 boss 40 extends above ribs 42 a distance indicated by the letter A in FIG. 5 with the end 44 of boss 40 making contact with seat or flange 38. By spacing the ribs 42 inwardly the ribs are spaced from contact seat 38. As illustrated in FIG. 5 the end 44 of boss 40 is of rounded cross-sectional shape to make firm contact yet minimize the area of contact between boss 40 and seat 38. Thus, a bearing surface is provided between end 44 and seat 38.

By having ribs 42 indented there is also assurance that the ribs 42 will not come into contact with the inner surface of outer wall 16.

In the preferred practice of the invention boss 40 is a female cylinder while boss 36 is a male cylinder which is telescopically mounted within boss 40 so that a second bearing surface results from the outer surface of male cylinder 36 and the inner surface of female cylinder 40. It is to be understood, however, that the invention may be practiced where the boss extending from the inner surface of outer wall 16 is the female member and the reel boss is the male member.

As shown in FIG. 5 the inner end of boss 40 is closed by insert 32. Boss 36 is preferably dimensioned so that it ends short of insert 32 and thus makes no contact with the insert 32. As shown in FIG. 1 the flange or seat 38 preferably extends the same distance above metallic insert 32 as does the end 44 of boss 40, thereby resulting in end 44 bearing against seat 38. The thickness of reel 26 (i.e. the distance between the outer surfaces of flanges 28,28) is less than the distance between the inner surfaces of walls 16,16. As a result the reel may move slightly toward and away from walls 16,16. This, in turn, results in a microfilm cassette with a floating reel.

Any suitable materials may be used for housing 10. Preferably, the housing and reel are made from plastic material, except for the metallic insert 32.

Reference is made to the drawings in provisional application Serial No. 60/064,748 which indicate suitable dimensions for the components of housing 10.

The housing assembly 10 thus provides a pair of bearing surfaces with one bearing surface being of a flange type resulting from boss 40 making contact against flange or seat 38. The other bearing surface results from the boss 36 which extends from the housing wall 16. Thus, there are bearing surfaces on the face and a perpendicular surface that comes in contact with the reel face and the inner female center circle.

What is claimed is:

1. A microfilm cartridge assembly comprising a housing in the form of first and second housing members, each of said housing members having an outer wall and a peripheral side wall mounted to and extending outwardly from said outer wall, said housing members including locking structure for detachably mounting said housing members together to create an assembled housing having a chamber formed between said outer walls and said side walls, a microfilm dispensing opening in said assembled side walls, said outer wall of said first member having an opening for permitting insertion of a spindle into said chamber, a reel located in said housing, said reel having spindle mounting structure disposed at said opening of said first member, said second member having an inwardly directed cylindrical boss in said chamber on said outer wall of said second member, said outer wall of said second member having an outwardly extending seat at least partially around said boss, said reel having a cylindrical boss disposed coaxially and in telescopic mounting relationship with said boss of said second member, each of said cylindrical bosses having a cylindrical surface, said cylindrical boss of said reel terminating in an axially outer end which is in surface contact with said seat to comprise a first bearing surface between said boss of said reel and said seat, and a second bearing surface resulting from a cylindrical surface of said boss of said reel and a cylindrical surface of said boss of said second member being in contact with each other, and wherein the axial end of the second member boss is spaced from said reel and the axially outer end of said reel boss is of rounded cross-section.

2. The assembly of claim 1 wherein said seat extends completely around said boss of said second member.

3. The assembly of claim 2 wherein said reel boss is a female cylinder, and said outer wall boss being a male cylinder telescopically mounted in said reel boss.

4. The assembly of claim 3 wherein said reel includes a centrally mounted hub around which the microfilm would be wound, a pair of spaced flanges extending from the outer ends of said hub, ribs extending from said hub inwardly to said reel boss, said reel boss having an outer end, and said ribs terminating axially inwardly of said flanges and said outer end of said reel boss.

5. The assembly of claim 4 including an insert mounted within said hub, a spindle mounting structure on said insert, said insert forming a bottom of said reel hub, and said ribs being disposed against said insert.

6. The assembly of claim 5 wherein said second member boss terminates inwardly of and spaced from said insert.

7. The assembly of claim 1 wherein said reel boss is a female cylinder, and said outer wall boss being a male cylinder telescopically mounted in said reel boss.

8. The assembly of claim 7 wherein said reel includes a centrally mounted hub around which the microfilm would be wound, a pair of spaced flanges extending from the outer ends of said hub, ribs extending from said hub inwardly to said reel boss, said reel boss having an outer end, and said ribs terminating axially inwardly of said flanges and said outer end of said reel boss.

9. The assembly of claim 8 wherein the outer end of said reel boss is of rounded cross-section.

10. The assembly of claim 9 including an insert mounted within said hub, spindle mounting structure on said insert, said insert forming the bottom of said reel hub, and said ribs being disposed against said insert.

11. The assembly of claim 10 wherein said second member boss terminates inwardly of and spaced from said insert.

\* \* \* \* \*